April 10, 1962 G. W. FYLER 3,029,391

WAVE-SIGNAL RECEIVER

Filed Dec. 1, 1958 2 Sheets-Sheet 1

INVENTOR
George W. Fyler
BY Francis W. Crotty
ATTORNEY

INVENTOR
George W. Fyler
BY Francis W. Crotty
ATTORNEY 3,029,391

WAVE-SIGNAL RECEIVER

George W. Fyler, Lombard, Ill., assignor to Zenith Radio Corporation, a corporation of Delaware Filed Dec. 1, 1958, Ser. No. 777,440
5 Claims. (Cl. 328—134)

This invention is directed to wave-signal receivers and more particularly to such receivers which utilize a balanced detector circuit to develop an output potential indicative of the difference in phase between an input signal and a reference signal.

Television receivers presently in commercial use reproduce an image upon the screen of a cathode-ray tube by utilizing both horizontal and vertical-deflection systems to sweep an electron beam across the face of the tube. By concurrently modulating the intensity of the beam, it is possible to produce light and dark areas at specific locations and thereby reproduce an image on the screen. The frequency standards now in use require the production of a scanning frequency of 15,750 cycles per second in the horizontal-deflection system. If this frequency is not accurately produced, or is not precisely synchronized in phase with the horizontal-scanning frequency of the pick-up apparatus which originally translates the image into electric signals, the image reproduced at the television receiver is subject to horizontal displacement or "tearing," which reduces its usefulness. It is therefore requisite that the frequency produced in a television receiver be not only accurate, but also precisely phase synchronized with the horizontal-scanning rate utilized in producing the television signals.

To assure phase synchronization of the horizontal-deflection system with the incoming composite television signal, it is conventional practice to separate the vertical and horizontal synchronizing (sync) pulses from the composite television signal and utilize these pulses to control the frequency of separate oscillators in the vertical and horizontal-deflection systems. For example, a phase detector system may be employed in the horizontal-deflection system to compare the phase of the deflection signal at the output of the system with the phase of the incoming horizontal-sync signal. Various circuits for accomplishing such phase detection are known but, because of one or more deficiencies, they operate at less than maximum sensitivity.

A balanced phase detector system frequently includes a pair of rectifiers, which may be conventional diodes or equivalent devices, and a pair of capacitors, one capacitor being associated with each rectifier. The capacitors are coupled to the rectifiers in such a way that the capacitors are charged as their associated rectifiers conduct; that is, these circuits function essentially as peak detectors so that the voltage developed across each capacitor approaches the peak voltage of the signals applied to the detector circuits. A unidirectional potential, related to the difference between the charges on the capacitors, can be derived from a point in the circuit; the polarity of this unidirectional potential denotes the sense of the phase deviation from an inphase condition, and the extent of the deviation is indicated by the amplitude of this potential.

One reason why maximum sensitivity frequently has not been obtained with prior phase detectors is that the input or sync signal has not been applied fully and equally to each of the peak detector circuits. Specifically, some of the prior circuits do not apply the fully sync signal to each detector circuit but in effect couple the peak detector circuits in series and apply the total sync pulse across the entire series circuit; i.e., half of the total sync potential is applied across each peak detector circuit. Such a circuit is only half as sensitive, and has only half the control voltage range, as a circuit which applies the full sync voltage across each detector circuit. Prior art circuits which purport to connect the peak detector circuits in parallel with respect to the input pulse have failed to accomplish the desirable purpose of applying substantially all of the sync pulse to each detector circuit because such circuits are, in effect, capacitive voltage dividers, rather than true parallel circuit connections. Moreover, the finite impedance of the sync pulse source in such arrangements normally unbalances the detector circuits, viewed from the reference signal source, because the source impedance is effectively shunted across one of the rectifier circuits; this unbalance is aggravated in those circuits where the reference alternating signal is injected at only one point, rather than utilizing balanced, opposite-polarity alternating signals separately applied to each rectifier circuit.

It is an object of the present invention therefore to provide a balanced phase detector circuit in which the input sync pulse is applied fully and equally to each of a pair of peak detector circuits.

It is another object of the invention to provide such a circuit which achieves a more perfect balance and therefore greater immunity to noise, than do prior art devices.

It is a further object of the invention to provide such a detector circuit which is not unbalanced by the impedance of the sync pulse source.

A balanced phase detector circuit constructed in accordance with the invention comprises a pair of rectifier elements, each of which has cathode and anode electrodes. Also included are a pair of capacitors; the first capacitor is series-coupled between the cathodes of the rectifiers. The circuit includes means for applying a synchronizing signal pulse of given polarity to the cathode of one rectifier and through the first capacitor to the cathode of the other rectifier with the same polarity. Also included is means for applying an alternating reference signal to the anode of the first rectifier through the second capacitor with one polarity, and to the anode of the other rectifier with opposite polarity. Balanced charging circuits are provided for the capacitors through their respective diodes, in addition to means, including a pair of series-coupled impedances connected between the anode of the first rectifier and the cathode of the second, for establishing balanced discharge circuits for the capacitors. Coupled to the junction of the series-coupled impedances is means for translating a unidirectional potential related to the phase difference between the synchronizing signal and the alternating reference signal.

The features of this invention which are believed to be novel are set forth with particularity in the appended claims. The invention, together with further objects and advantages thereof, may best be understood, however, by reference to the following description taken in conjunction with the accompanying drawings, in the several figures of which like reference numerals identify like elements, and in which:

Figures 1, 2:
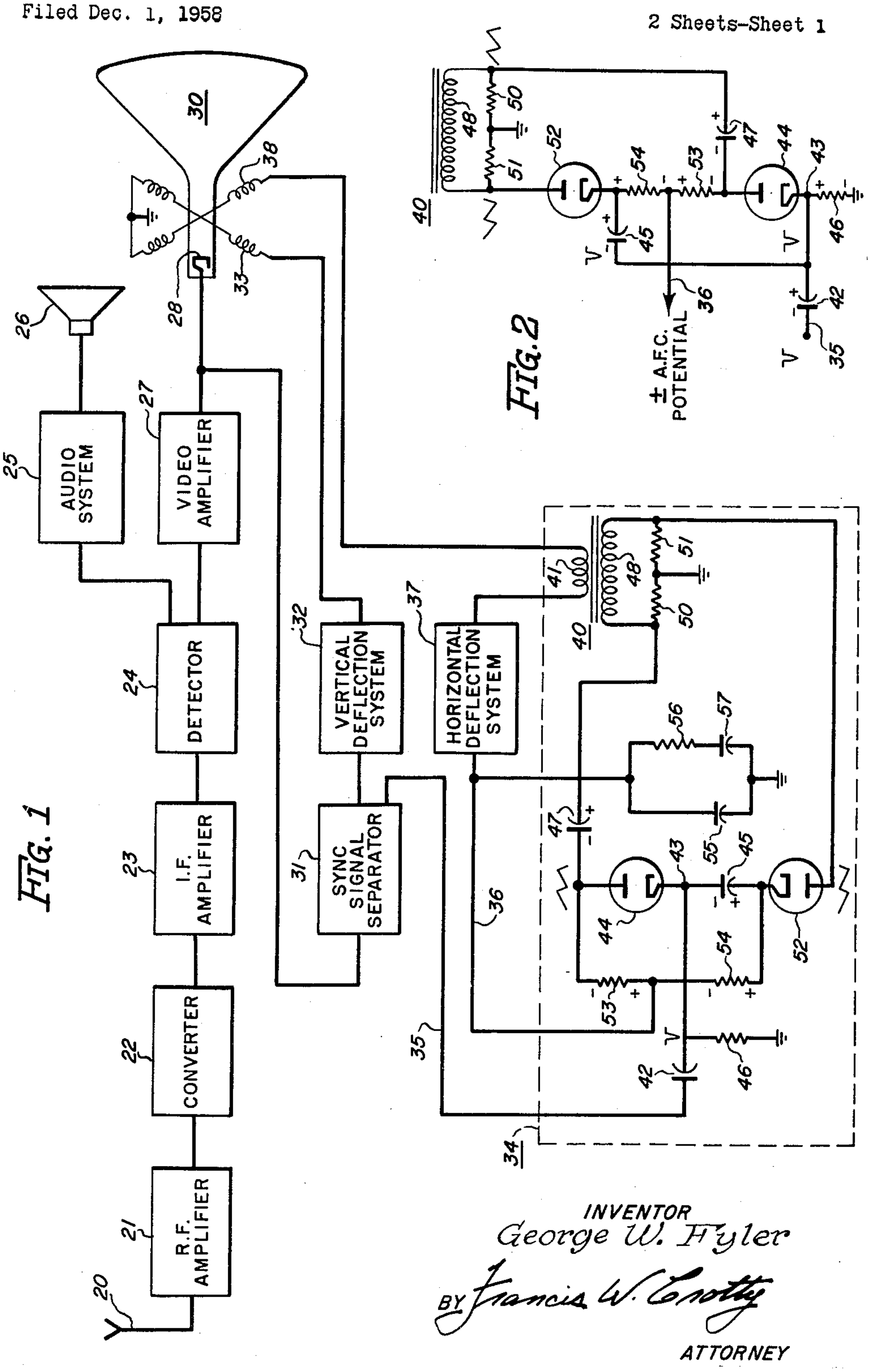
FIGURE 1 is a block diagram, partly in schematic form, illustrating a television receiver including a phase detector constructed in accordance with one embodiment of the invention.
FIGURE 2 is an equivalent circuit diagram useful in understanding the operation of the phase detector circuit shown in FIGURE 1.

The embodiment illustrated in FIGURE 1 includes a television receiver having an antenna 20 cascade-coupled with an R.-F. amplifier 21, a converter 22, an I.-F. amplifier 23 and a video detector 24. An audio system 25 is connected between the output of detector 24 and a loud speaker or other sound-reproducing device 26. A video amplifier 27 is also coupled to the output of detector 24, and in turn the video amplifier 27 is coupled to the cathode 28 of an image-reproducing device 30.

Another connection from the output of video amplifier 27 is made to the input of a sync-signal separator 31. One output circuit from sync-signal separator 31 is coupled to the vertical-deflection system 32, the output of which is connected to one end of vertical-deflection coils 33; the other end of coil 33 is connected to a point of reference potential such as ground. Another output circuit from sync-signal separator 31 is coupled to the input circuit of a phase detector 34 over conductor 35. An output connection from phase detector 34 is made over a conductor 36 to the horizontal-deflection system 37, the output of which is coupled through the horizontal-deflection coils 38 to a point of reference potential such as ground. The foregoing circuit elements, with the exception of the novel phase detector circuit 34, represent circuit components which are well known and understood in the art; accordingly, only a brief description is given here to set forth the operational details of the illustrated circuit.

In operation, a composite television signal received at antenna 20 is amplified in R.-F. amplifier 21 (which, like the other stages represented in block form, may comprise one or more tubes and associated circuitry) and applied to converter 22. The intermediate-frequency signal from the output of converter 22 is amplified in intermediate-frequency amplifier 23 and detected in detector 24. It is assumed that the depicted circuit is an intercarrier system, and a portion of the signal from the detector 24 is converted and amplified in the audio system 25 and utilized to drive the sound-reproducing device 26.

Another portion of the output signal from detector 24 is amplified in video amplifier 27 and applied to the cathode 28 of cathode-ray tube 30, thus to provide intensity modulation of the cathode-ray beam as it is swept over the screen of the tube.

A portion of the amplified output signal from video amplifier 27 is applied to the input of sync-signal separator 31, which separates the vertical and horizontal-sync information from the remainder of the input signal. The vertical-sync pulses are applied to vertical-deflection system 32 and utilized to synchronize the frequency of this system with the vertical-sync pulses in the received composite signal. The output of vertical-deflection system 32 is used to drive field-sweep coils 33.

The horizontal-sync pulses from sync-signal separator 31 are applied over conductor 35 to the balanced phase detector circuit 34. Simultaneously, a balanced sawtooth reference signal is applied from horizontal-deflection system 37 across a current transformer 40, and thus to phase detector 34. In a manner which will be fully described hereinafter, phase detector 34 effects a precise comparison between the phase of the input-sync signal and the phase of the alternating reference signal, and a unidirectional potential which is related both in polarity and in amplitude to the phase difference between the two signals is fed over conductor 36 to the input of horizontal-deflection system 37. As will be made clear hereinafter, the polarity of this unidirectional potential (hereinafter termed "AFC potential") signifies whether the sync signal occurs earlier or later than the reference signal, while the magnitude of the AFC potential indicates the extent of the phase difference. This AFC potential is utilized to control a reactance tube or other similar electronic circuit in well-known manner to regulate the frequency of the current wave generated in the horizontal-deflection system and applied to line-sweep coils 38.

Turning now to the structure of phase detector 34, an output circuit of sync-signal separator 31 is coupled over conductor 35 and coupling capacitor 42 to the junction 43 between the cathode of one rectifier 44 and a first phase detector capacitor 45; a resistor 46 is coupled between junction 43 and a point of reference potential such as ground.

The anode of rectifier 44 is coupled through a second phase detector capacitor 47 to one side of the secondary winding 48 of current transformer 40. Resistive loading of this transformer and balanced reference voltages are provided by equal resistors 50 and 51, connected in shunt with the secondary winding 48 and having their common junction grounded. The end of secondary winding 48 remote from capacitor 47 is coupled to the anode of the other rectifier 52, the cathode of which is connected to the cathode of rectifier 44 through capacitor 45.

A single series discharge circuit is provided for both capacitor 45 and capacitor 47 during the intervals when rectifiers 44 and 52 are non-conductive. The discharge circuit extends from ground over the negligible resistance of resistor 50, over capacitor 47, resistors 53 and 54, capacitor 45, and resistor 46 to ground. Because capacitors 45 and 47 have the same discharge circuit, it is evident that phase detector 34 can be characterized as having balanced discharge circuits.

Between conductor 36 and ground is inserted a parallel circuit, one leg of which includes a capacitor 55 and the other leg of which includes a resistor 56 series-connected with a capacitor 57.

The operation of phase detector 34 will be described in connection with the circuit as redrawn in FIGURE 2. As there shown, the AFC potential appearing at conductor 36 depends upon the potential established at the junction of load resistors 53 and 54 by the average current flowing therethrough.

Specifically, when rectifiers 44 and 52 are rendered conductive in response to the application of an input sync pulse over conductor 35 and capacitor 42, the full potential of the pulse is applied across each of the rectifier circuits. Accordingly the full amplitude of the input sync pulse is applied across a circuit including capacitor 45, rectifier 52 and the low impedance of resistor 51. Thus capacitor 45 is charged during the input pulse periods and a voltage of the polarity indicated in FIGURE 2 appears thereacross. The full amplitude of the sync pulse is also applied across a circuit including rectifier 44, capacitor 47 and the low impedance of resistor 50. Accordingly, capacitor 47 acquires a charge of the polarity indicated during the same intervals that capacitor 45 is charged. It is evident that the impedance of each of the two input circuits, viewed from coupling capacitor 42, is exactly equal. The impedance presented by capacitor 45 and rectifier 52 is exactly equal to that of rectifier 44 and capacitor 47. Accordingly, a balanced input circuit is provided and substantially the full amplitude of the sync voltage appears across each of capacitors 45 and 47.

In the intervals between sync pulses, a discharge current flows through the discharge circuit described above. Both resistors 51 and 50 exhibit a small electrical resistance; accordingly, their resistance can be disregarded when contrasted to the resistance exhibited by resistors 46, 53 and 54. As capacitors 45 and 47 discharge slightly, current flows through resistors 53 and 54 and develops voltages thereacross of the polarities indicated in FIGURE 2. It is evident that, if the total resistance of resistors 46 and 53 is made equal to that of resistor 54, the AFC potential appearing at conductor 36 is approximately zero or ground potential. That is, the ground potential point between the negative potential appearing at the anode of rectifier 44 and the positive potential developed at the cathode of rectifier 52 will be at the junction of resistors 53 and 54, when resistor 46 is sized as indicated above.

Another consideration affects the size of resistor 46. This element is chosen to effect differentiation, in conjunction with capacitor 42, of the vertical sync pulses applied over conductor 35. Thus more stable operation of the horizontal-deflection system is obtained, and the possibility of "tearing" at the top of the picture is minimized. An example of suitable values for the various circuit constants is given at the end of the specification.

Figure 3:
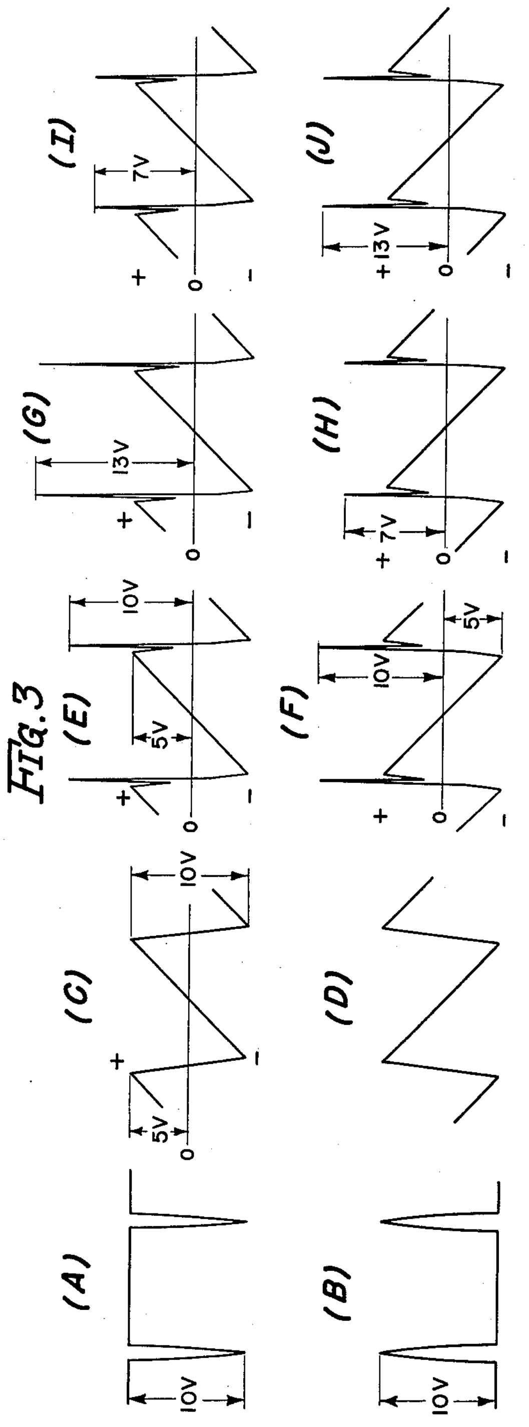
FIGURES 3A–3J are graphical illustrations useful in understanding the operation of the invention.

Application of the negative sync pulse to the cathodes of rectifiers 44 and 52 is exactly equivalent to the application of a positive sync pulse to the anodes of these rectifiers. If negative sync pulses of, for example, ten volts in amplitude (as shown in FIGURE 3A) are injected through capacitor 42, the effect is exactly the same as though positive-going sync pulses of ten volts in amplitude (FIGURE 3B) were applied to the anodes of each of rectifiers 44 and 52. The average D.-C. current flowing through the above-described discharge path is the sum of the voltages appearing across each of capacitors 45 and 47 (substantially twice the amplitude of the input sync pulse), divided by the total resistance of resistors 46, 53 and 54. In effect a peak voltage of twenty volts (ten volts injected in each rectifier circuit) is thus applied across the entire discharge path.

If it is assumed that a balanced sawtooth waveform of ten volts peak-to-peak amplitude is applied by way of current transformer 40 to the anode of rectifier 52 and, through capacitor 47, to the anode of rectifier 44, the axis of the sawtooth waveform is at zero or ground potential because of the transformer coupling. More specifically, it is assumed that a sawtooth waveshape of the polarity indicated in FIGURE 3C is applied to the anode of rectifier 44 and an opposite polarity signal, such as that shown in FIGURE 3D, is applied to the anode of rectifier 52.

At the anode of rectifier 44 the net effective potential with respect to the cathode, in view of the sawtooth reference wave applied to the anode as the negative sync pulse is applied to the cathode, is that depicted in FIGURE 3E. For the phase condition illustrated, the sync pulses occur at the time sawtooth signal crosses its reference axis and since the pulses are ten volts in amplitude, it is evident that the peak-to-ground potential impressed across rectifier 44 during the sync interval is exactly the same as if the sync voltage alone were applied to the rectifier. However, as will be shown hereinafter, this phasing of the sync pulse in relation to the reference sawtooth only occurs when there is exact phase synchronism between such applied signals. Accordingly a ten volt peak-to-ground signal is impressed across the detector circuit including rectifier 44.

In a similar manner, the opposite polarity reference sawtooth waveshape shown in FIGURE 3D is effectively combined with the sync pulses applied to the cathode of rectifier 52 to provide a resultant waveform shown in FIGURE 3F. The phase relation of the sync pulse relative to the reference sawtooth is the same as described in conjunction with curve 3E, resulting in a ten volt peak-to-ground signal across the circuit of rectifier 52. Accordingly, the peak-to-ground potentials developed across rectifiers 44 and 52 under the condition of exact phase synchronism are exactly the same, and thus the same charges appear on capacitors 45 and 47 as when only sync potentials are applied to the balanced phase detector, and the same average discharge current flows through the circuit described hereinbefore. Thus the AFC potential at conductor 36 is zero, signifying an in-phase condition.

Let it now be assumed that the input sync signals are not in exact phase synchronism with the sawtooth waveshape but arrive earlier in point of time. As shown in FIGURE 3G, this results in the effective superposition of the sync pulse on a positive portion of the sawtooth waveshape. Accordingly, for the potentials and phase conditions chosen to illustrate the assumed operating conditions, a peak-to-ground potential of approximately thirteen volts is injected at rectifier 44 and capacitor 47 is charged to substantially this potential. However, the early-arriving sync pulses are effectively added to a negative portion of the sawtooth signal applied to the anode of rectifier 52, as illustrated in FIGURE 3H. As there shown, the peak-to-ground potential developed across rectifier 52 is only approximately seven volts, and this is substantially the potential to which capacitor 45 is charged. It is evident that the total of the two capacitor potentials is still the same (twenty volts) and that therefore the average discharge current flowing through capacitor 47, resistors 53 and 54, capacitor 45 and resistor 46, remains unchanged. However, the equipotential point formerly occurring at the junction of resistors 53 and 54 is displaced toward the cathode of rectifier 52, because of the larger potential to which capacitor 47 is charged. Accordingly, the AFC potential appearing at conductor 36 goes negative. The negative polarity indicates that the input sync signal is leading the reference alternating waveshape, and the amplitude of the AFC potential indicates the extent of the phase difference. This AFC potential is utilized to control the frequency of the horizontal-deflection system in a manner well known and understood in the art.

It is evident that for optimum operation the amplitude of the sync input pulse should equal or exceed the peak-to-peak amplitude of the sawtooth signal. Were this not so, there could be a phase condition in which the sync pulse might be combined with the most negative part of the sawtooth with the result that the voltage amplitude from the top of the sync pulse to the axis (ground) of the sawtooth would be less than the peak-to-ground voltage of the sawtooth signal alone. Such operation does not produce the maximum possible corrective AFC potential.

Let it now be assumed that the opposite condition of phase displacement occurs; specifically, that the input sync pulse occurs later in time than the center of the retrace portion of the reference sawtooth signal. As shown in FIGURE 3I, this results in the effective addition of the sync pulse to a point on the retrace portion of the sawtooth applied to the anode of rectifier 44 which is negative with respect to ground or the reference axis. Accordingly, the peak-to-ground potential developed across rectifier 44 for the assumed condition is only seven volts, and this is the potential toward which capacitor 47 is charged. For the other rectifier circuit, however, the sync pulse is effectively added to a portion of the sawtooth which is positive with respect to ground potential, providing a resultant peak-to-ground voltage of approximately thirteen volts as shown in FIGURE 3J; this is substantially the potential acquired by capacitor 45. Thus the larger potential appears across capacitor 45 and the equipotential point which occurs at conductor 36 for in-phase conditions is displaced toward rectifier 44. Accordingly, the AFC conductor acquires a positive potential which is indicative of the fact that the sync pulse arrives later in time than required for phase synchronism. As before, the magnitude of the unidirectional AFC potential is indicative of the amount of phase displacement between the input and the reference signals.

Although the effective potentials applied to the respective rectifier circuits differ as the phase of the input signal varies with respect to the reference sawtooth, a substantially constant average discharge current flows through the circuit including resistor 46, capacitor 47, resistors 53 and 54, and capacitor 45. A stable system is thus provided in which the polarity of the AFC potential, indicative of the phase variation, shifts from positive to negative depending upon which of the rectifier-capacitor circuits has the larger peak-to-ground potential instantaneously impressed thereacross.

It will be apparent to those skilled in the art that the invention can be used with positive input sync pulses, merely by reversing the connections to diodes 44 and 52. If it is desired to reverse the polarity of the AFC potential, this is readily accomplished by reversing the connections to the primary or secondary winding of transformer 40, thus reversing the polarities of the sawtooth reference voltages applied to the anodes of the rectifiers.

Circuit elements 55–57 (FIGURE 1) are not part of the phase detector circuit proper. Capacitor 55 is included to shunt high-frequency transients and noise to ground, and the series circuit of resistor 56 and capacitor 57, exhibiting a time constant long with respect to the interval between successive sync pulses, by reason of its circuit connection forms a part of the input impedance of the horizontal-deflection system 37.

Figure 4:
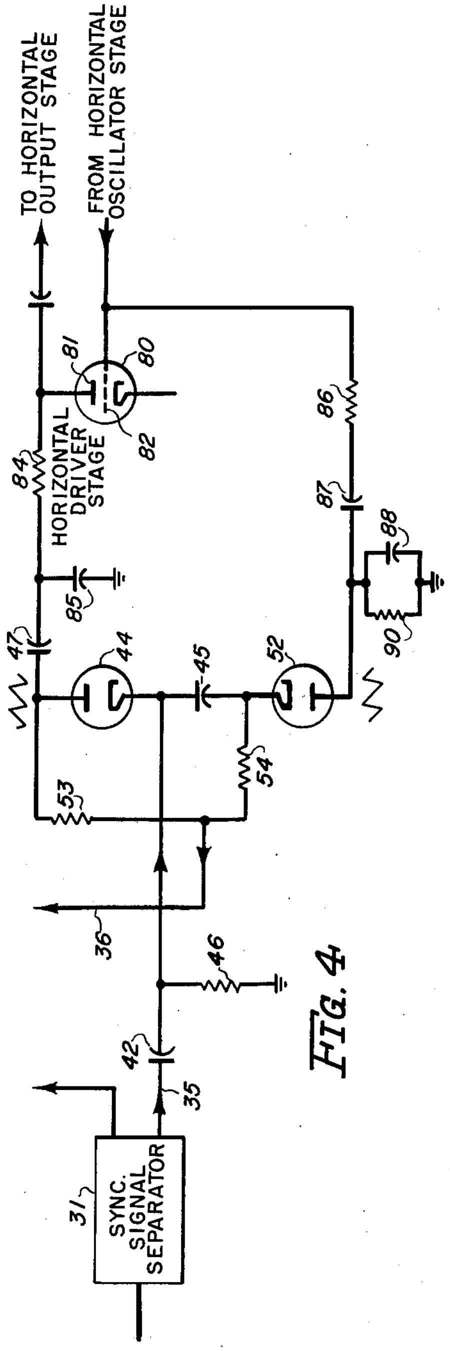
FIGURE 4 is a partial schematic diagram illustrating another embodiment of the invention.

An alternative to the resistively loaded secondary winding 48 of transformer 40 is a coupling circuit including a center-tapped transformer. Another structural arrangement is illustrated in FIGURE 4. As there shown, the horizontal driver stage 80 of a television receiver includes an anode 81 and a control grid 82. Conventionally a positive pulse appears at the control grid of stage 82, and a negative pulse appears at the anode 81 in time coincidence with the positive pulse occurring in the grid circuit. The anode 81 is coupled through a resistor 84 and capacitor 47 to the anode of rectifier 44. A wave-shaping circuit which in this embodiment includes resistor 84 and an integrating capacitor 85 is completed by the connection of capacitor 85 between a joint of reference potential such as ground and the junction of capacitor 47 and resistor 84.

The control grid 82 is coupled through a series resistor 86 and a coupling capacitor 87 to the anode of rectifier 52; a wave-shaping circuit comprising an integrating capacitor 88 is connected between the anode of rectifier 52 and ground. The D.-C. current path between the anode of rectifier 52 and ground is completed by resistor 90.

The operation of the balanced phase detector arrangement of FIGURE 4 is exactly the same as that described hereinbefore in connection with the embodiment of FIGURE 1. The manner of obtaining the alternating reference potential of sawtooth wave form is somewhat different. The negative pulse from anode 81 of stage 80 is integrated by resistor 84 and capacitor 85 to provide a sawtooth waveform of one polarity at the anode of rectifier 44. The opposite polarity pulse in the grid circuit is coupled over resistor 86 and capacitor 87, and is integrated by resistor 86 and capacitor 88 to form a sawtooth waveform of the opposite polarity at the anode of rectifier 52.

It is manifest that the circuit of the invention provides balanced input circuits in which the input or sync pulse sees substantially equal A.-C. impedances to ground through each of the two peak detector circuits. Moreover, the full voltage of the sync pulse is applied to each of the two peak detector circuits and is not dissipated over a capacitive voltage divider or a series arrangement of the rectifiers. It is evident that by applying the entire sync potential across each input circuit the invention is substantially more sensitive than prior art circuits which effectively distribute the input pulse across a series arrangement of the peak detector circuits.

It is noted that the impedance of the sync signal source does not upset the balance of the input circuits; circuits of identical impedance (rectifier 52 and capacitor 45, capacitor 47 and rectifier 44) are connected between each terminal of secondary winding 48 and reference junction 43, where the input sync pulse is applied. The more perfect circuit balance thus attained enhances the immunity of the invention to noise and other random signals.

The rectifiers 44 and 52 of the balanced phase detector circuit are illustrated as conventional diodes; it will be understood that these elements may also be germanium rectifiers or other known elements which exhibit a high impedance to current flow in one direction and a low impedance in the opposite direction. As to the remaining elements in the detector circuit, the following table illustrates typical values; it is understood that these values are given only by way of illustration and in no sense by way of limitation.

| | | |
|---|---|---|
| Resistor **46** | | 100K |
| Resistor **50** | | 47 |
| Resistor **51** | | 47 |
| Resistor **53** | | 900K |
| Resistor **54** | | 1M |
| Resistor **56** | | 100K |
| Capacitor **42** | mmf | 100 |
| Capacitor **45** | mf | 0.001 |
| Capacitor **47** | mf | 0.001 |
| Capacitor **55** | mf | 0.001 |
| Capacitor **57** | mf | 0.047 |

While particular embodiments of the present invention have been shown and described, it is apparent that changes and modifications may be made therein without departing from the invention in its broader aspects. The aim of the appended claims, therefore, is to cover all such changes and modifications as fall within the true spirit and scope of the invention.

I claim:

1. A balanced phase detector circuit comprising: a pair of rectifier elements, each having cathode and anode electrodes; a pair of capacitors, the first capacitor series-coupled between the cathodes of said rectifiers; means for applying a synchronizing signal pulse of given polarity to the cathode of one of said rectifiers and through said first capacitor to the cathode of the other rectifier with said given polarity; means for applying an alternating reference signal to the anode of said one rectifier through the second of said capacitors with one polarity and to the anode of said other rectifier with opposite polarity; means providing balanced charge circuits for said capacitors through their respective diodes; means including a pair of series-coupled impedances coupled between the anode of said one rectifier and the cathode of said other rectifier providing balanced discharge circuits for said capacitors; and means coupled to the junction of said series-coupled impedances for translating a unidirectional potential related to the phase difference between said synchronizing signal and said alternating reference signal.

2. A balanced phase detector circuit comprising: a pair of rectifier elements, each having cathode and anode electrodes; a pair of capacitors, the first capacitor series-coupled between the cathodes of said rectifiers; means for injecting a synchronizing signal pulse of given polarity at a reference junction intermediate the cathode of one of said rectifiers and said first capacitor to apply said signal with said given polarity to the cathode of each rectifier; means for applying an alternating reference signal to the anode of said one rectifier through the second of said capacitors with one polarity and to the anode of said other rectifier with opposite polarity; means for providing balanced charge circuits for said capacitors through their respective diodes; means including a pair of series-coupled impedances coupled between the anode of said one rectifier and the cathode of said other rectifier providing balanced discharge circuits for said capacitors; and means coupled to the junction of said series-coupled impedances for translating a unidirectional potential related to the phase difference between said synchronizing signal and said alternating reference signal.

3. A balanced phase detector circuit comprising: a pair of rectifier elements, each having cathode and anode electrodes; a pair of capacitors, the first capacitor series-coupled between the cathodes of said rectifiers; means for applying a synchronizing signal pulse of given polarity to the cathode of one of said rectifiers and through said first capacitor to the cathode of the other rectifier with said given polarity; means for applying an alternating reference signal to the anode of said one rectifier through the second of said capacitors with one polarity and to the anode of said other rectifier with opposite polarity; means providing balanced charge circuits for said capacitors through their respective diodes; means, including a pair of series-coupled resistors coupled between the anode of said one rectifier and the cathode of said other rectifier, providing balanced discharge circuits for said capacitors and exhibiting, at the junction of said resistors, a unidirectional potential having a polarity and amplitude related to the phase difference between said synchronizing signal and said alternating reference signal; and means coupled to said junction for translating said unidirectional potential.

4. A balanced phase detector circuit comprising: a pair of rectifier elements, each having cathode and anode electrodes; a pair of capacitors, the first capacitor series-coupled between the cathodes of said rectifiers; means for applying a synchronizing signal pulse of given polarity to the cathode of one of said rectifiers and through said first capacitor to the cathode of the other rectifier with said given polarity; means including a transformer having primary and secondary windings, with one end of the secondary winding coupled through the second of said capacitors to the anode of said one rectifier and the other end of the secondary winding coupled to the anode of said other rectifier for applying alternating reference signals of opposite polarity to said rectifier anodes; means providing balanced charge circuits for said capacitors through their respective diodes; means including a pair of series-coupled impedances coupled between the anode of said one rectifier and the cathode of said other rectifier providing balanced discharge circuits for said capacitors; and means coupled to the junction of said series-coupled impedances for translating a unidirectional potential related to the phase difference between said synchronizing signal and said alternating reference signal.

5. A balanced phase detector circuit comprising: a pair of rectifier elements, each having cathode and anode electrodes; a pair of capacitors, the first capacitor series-coupled between the cathodes of said rectifiers; means for applying a synchronizing signal of given polarity to the cathode of one of said rectifiers and through said first capacitor to the cathode of the other rectifier with said given polarity; means including a first wave-shaping circuit for applying an alternating reference signal of one polarity through the second of said capacitors to the anode of said one rectifier and a second wave-shaping circuit for applying a similar alternating reference signal of opposite polarity to the anode of said other rectifier; means providing balanced charge circuits for said capacitors through their respective diodes; means including a pair of series-coupled impedances coupled between the anode of said one rectifier and the cathode of said other rectifier providing balanced discharge circuits for said capacitors; and means coupled to the junction of said series-coupled impedances for translating a unidirectional potential related to the phase difference between said synchronizing signal and said alternating reference signals.

References Cited in the file of this patent

UNITED STATES PATENTS

| | | |
|---|---|---|
| 2,407,536 | Chapman | Sept. 10, 1946 |
| 2,410,983 | Koch | Nov. 12, 1946 |
| 2,564,471 | Eaton | Aug. 14, 1951 |
| 2,669,655 | Gruen | Feb. 16, 1954 |
| 2,856,522 | Bachmann | Oct. 14, 1958 |
| 2,871,351 | Kuder | Jan. 27, 1959 |
| 2,896,078 | Moore | July 21, 1959 |
| 2,903,581 | Kippenhan | Sept. 8, 1959 |